United States Patent
Sakai et al.

(10) Patent No.: US 10,571,702 B2
(45) Date of Patent: Feb. 25, 2020

(54) LIGHT IRRADIATION DEVICE HAVING SLM OPTICALLY COUPLED DIRECTLY TO AMPLITUDE MASK WITH CONTINUOUSLY DECREASING TRANSMITTANCE REGION

(71) Applicant: HAMAMATSU PHOTONICS K.K., Hamamatsu-shi, Shizuoka (JP)

(72) Inventors: Hiroto Sakai, Hamamatsu (JP); Yuu Takiguchi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 196 days.

(21) Appl. No.: 15/544,935

(22) PCT Filed: Jan. 12, 2016

(86) PCT No.: PCT/JP2016/050666
§ 371 (c)(1),
(2) Date: Jul. 20, 2017

(87) PCT Pub. No.: WO2016/117409
PCT Pub. Date: Jul. 28, 2016

(65) Prior Publication Data
US 2017/0363876 A1  Dec. 21, 2017

(30) Foreign Application Priority Data

Jan. 22, 2015  (JP) .................................. 2015-010325

(51) Int. Cl.
*G02B 27/09* (2006.01)
*G03H 1/00* (2006.01)
(Continued)

(52) U.S. Cl.
CPC ..... *G02B 27/0927* (2013.01); *G02B 27/0988* (2013.01); *G03H 1/0005* (2013.01);
(Continued)

(58) Field of Classification Search
CPC ........ G02B 5/1842; G02B 5/20; G02B 5/203; G02B 5/205; G02B 5/206; G02B 5/207;
(Continued)

(56) References Cited

U.S. PATENT DOCUMENTS

| 5,148,316 A | 9/1992 | Horner et al. |
| 2004/0183965 A1* | 9/2004 | Lundgren ............. G02B 5/005 349/113 |

(Continued)

FOREIGN PATENT DOCUMENTS

| CN | 1680854 A | 10/2005 |
| CN | 101339298 | 1/2009 |

(Continued)

OTHER PUBLICATIONS

F. Dickey et al., "Laser Beam Shaping Theory and Techniques", CRC Press, 2000, p. 82-p. 91.
(Continued)

*Primary Examiner* — Ryan S Dunning
(74) *Attorney, Agent, or Firm* — Drinker Biddle & Reath LLP

(57) ABSTRACT

A light irradiation device includes a Gaussian beam output unit for outputting light having a light intensity distribution that conforms to a Gaussian distribution, a spatial light modulator for receiving the light and modulating the light by presenting a CGH, an optical system for converging the modulated light, and an amplitude mask arranged on at least one of an optical axis between the Gaussian beam output unit and the spatial light modulator and an optical axis between the spatial light modulator and the optical system. The amplitude mask has a circular-shaped first region centered on the optical axis and an annular-shaped second
(Continued)

region that surrounds the first region. Transmittance in the second region continuously decreases as a distance from the optical axis increases.

10 Claims, 17 Drawing Sheets

(51) Int. Cl.
 *G03H 1/08* (2006.01)
 *G03H 1/22* (2006.01)
 *G02B 5/20* (2006.01)
 *G03H 1/02* (2006.01)
(52) U.S. Cl.
 CPC .............. *G03H 1/08* (2013.01); *G03H 1/2202* (2013.01); *G03H 1/2294* (2013.01); *G02B 5/205* (2013.01); *G03H 2001/0224* (2013.01); *G03H 2001/2244* (2013.01)
(58) Field of Classification Search
 CPC .............. G02B 5/22–265; G02B 5/289; G02B 6/0061; G02B 26/02; G02B 27/0927; G02B 27/0938; G02B 27/0944; G02B 27/0977; G02B 27/0988; G02B 27/4205; G02B 27/46; G02B 27/58; G03B 21/005; G03B 21/006; G03B 21/008; G03H 1/0005; G03H 2001/0216; G03H 2001/0224; G03H 1/0465; G03H 1/08; G03H 1/0808; G03H 2001/0816; G03H 2001/0825; G03H 2001/0833; G03H 1/2202; G03H 2001/2207; G03H 2001/2244; G03H 2001/2247; G03H 1/2294; G03H 2222/35; G03H 2223/12; G03H 2225/12; G03H 2225/31; G03H 2225/32; G03H 2225/34
 USPC .......... 353/97; 359/9–11, 15, 239, 276, 277, 359/577, 580, 584, 585, 885, 888
 See application file for complete search history.

(56) References Cited

U.S. PATENT DOCUMENTS

| | | | |
|---|---|---|---|
| 2006/0274393 A1* | 12/2006 | Fotheringham | G02B 27/0927 359/15 |
| 2009/0027575 A1 | 1/2009 | Miyauchi et al. | |
| 2015/0112144 A1* | 4/2015 | Chen | A61B 1/00167 600/156 |

FOREIGN PATENT DOCUMENTS

| | | |
|---|---|---|
| CN | 101349871 A | 1/2009 |
| CN | 101673561 A | 3/2010 |
| CN | 101849199 A | 9/2010 |
| JP | S55-041480 A | 3/1980 |
| JP | 2001-215459 A | 8/2001 |
| JP | 2002-207202 A | 7/2002 |
| JP | 2011-152578 A | 8/2011 |
| JP | 2011-215459 A | 10/2011 |

OTHER PUBLICATIONS

International Preliminary Report on Patentability dated Aug. 3, 2017 for PCT/JP2016/050666.

* cited by examiner (a)

(b)

LIGHT IRRADIATION DEVICE HAVING SLM OPTICALLY COUPLED DIRECTLY TO AMPLITUDE MASK WITH CONTINUOUSLY DECREASING TRANSMITTANCE REGION

TECHNICAL FIELD

An aspect of the present invention relates to a light irradiation device.

BACKGROUND ART

Non-Patent Literature 1 discloses a scheme of generating illumination light having a uniform light intensity distribution within a certain surface perpendicular to the optical axis. The scheme of generating such illumination light includes an example of a scheme of modulating input light having a light intensity distribution according to a Gaussian distribution by a spatial light modulator. In this scheme, a computer generated hologram (CGH), which makes the light intensity distribution uniform in a predetermined range within a light converging surface, is presented by the spatial light modulator. A CGH to be presented on the spatial light modulator is designed on the basis of a function of one-dimensional $\xi$ shown in the following Equations (1) ($\phi(\xi)$ is a phase value presented at a position $\xi$).

[Math. 1]

$$\frac{d\varphi(\xi)}{d\xi} = B \int_0^{\xi} I(\xi')d\xi' \quad (1)$$

$$I(\xi') = e^{-\xi'^2}$$

CITATION LIST

Non Patent Literature

[Non-Patent Literature 1] Fred M. Dickey, Scott C. Holswade "Laser Beam Shaping Theory And Techniques", CRC Press (2000)

SUMMARY OF INVENTION

Technical Problem

In recent years, studies have been made to generate illumination light for observation of a microscopic position or laser light for use in laser processing using a spatial light modulator. By controlling a CGH to be presented on the spatial light modulator, it is possible to generate light having a desired intensity distribution in which, for example, a light intensity within a predetermined region, is uniform.

The intensity distribution of light (before modulation) input to the spatial light modulator follows a Gaussian distribution (hereinafter, such light is referred to as a Gaussian beam) in many cases. Accordingly, as the CGH to be presented on the spatial light modulator, a hologram assumed to modulate an ideal Gaussian beam is provided. However, the intensity distribution of the light that is actually modulated (or modulated) by the spatial light modulator may be discontinuously deformed from an ideal Gaussian distribution due to loss in a peripheral edge or the like by an optical component (for example, an aperture, an edge mask, or the like) arranged on the optical path. In such a case, if the CGH for which an ideal Gaussian beam is assumed is presented on the spatial light modulator, the light intensity distribution of the obtained output light is away from the desired distribution. For example, even if the CGH for making the light intensity in the predetermined region uniform is presented on the spatial light modulator, if a peripheral edge of the input light is cut off by the aperture, uniformity of the light intensity in the predetermined region may be deteriorated due to an influence of diffracted light from the peripheral edge.

An aspect of the present invention has been made in view of such a problem and an objective of the present invention is to provide a light irradiation device that approximates an intensity distribution of output light to a desired distribution even when the light intensity distribution is discontinuously deformed from a Gaussian distribution.

Solution to Problem

In order to solve the above-described problem, a light irradiation device according to an embodiment of the present invention includes a Gaussian beam output unit for outputting light having a light intensity distribution that conforms to a Gaussian distribution; a spatial light modulator for receiving the light and modulating the light by presenting a CGH; an optical system for converging the light modulated by the spatial light modulator; and an amplitude mask arranged on at least one of an optical axis between the Gaussian beam output unit and the spatial light modulator and an optical axis between the spatial light modulator and the optical system. The amplitude mask has a circular-shaped first region centered on the optical axis and an annular-shaped second region that surrounds the first region. Transmittance in the second region continuously decreases as a distance from the optical axis increases.

Also, another light irradiation device according to an embodiment of the present invention includes a Gaussian beam output unit for outputting light having an intensity distribution that conforms to a Gaussian distribution; a spatial light modulator for receiving the light and modulating the light by presenting a CGH; an optical system for converging the light modulated by the spatial light modulator; and an amplitude mask arranged on at least one of an optical axis between the Gaussian beam output unit and the spatial light modulator and an optical axis between the spatial light modulator and the optical system. The amplitude mask has a circular-shaped first region centered on the optical axis and an annular-shaped second region that surrounds the first region. A light intensity of a part of the light transmitted through the second region continuously decreases as a distance from the optical axis increases.

In each of the above-described light irradiation devices, light output from the Gaussian beam output unit is modulated by the spatial light modulator and converged by the optical system. A CGH for which the intensity distribution of the light converged by the optical system becomes a desired distribution on the light converging surface can be presented to the spatial light modulator. Furthermore, in each of the above-described light irradiation devices, an amplitude mask having an annular-shaped second region centered on the optical axis is provided on the optical axis of the front stage or the rear stage of the spatial light modulator (or both thereof). The inventors of the present invention have found that the influence of the deformation on the light intensity distribution of the output light is alleviated even when the intensity distribution of light before its arrival at the light converging optical system is discontinuously deformed from the Gaussian distribution in a case where a light intensity of a part transmitted through the second region continuously decreases as a distance from the optical axis increases, in such an amplitude mask. Also, such a light intensity of the light transmitted through the second region can be realized, for example, by continuously decreasing the transmittance of the second region as the distance from the optical axis increases. Therefore, each light irradiation device described above can approximate an intensity distribution of output light to the desired distribution even when the light intensity distribution is discontinuously deformed from a Gaussian distribution.

Also, each light irradiation device described above may further include a photodetector for detecting a light intensity distribution on a light converging surface of the light converged by the optical system; and a control unit for providing the computer generated hologram for generating a desired light intensity distribution on the light converging surface on the basis of output data from the photodetector. According to this configuration, a light intensity distribution on a light converging surface can be more accurately approximated to a desired distribution according to feedback control. Also, because the second region of the amplitude mask has the above-described configuration, it is possible to more easily approximate the light intensity distribution on the light converging surface to the desired distribution.

Also, in each light irradiation device described above, transmittance in the first region may be uniform. Thereby, it is possible to more easily approximate the light intensity distribution on the light converging surface to the desired distribution. Also, for example, if the transmittance in the first region is substantially 100%, it is possible to improve light utilization efficiency by reducing light loss by the amplitude mask.

Also, in each light irradiation device described above, a width ($r_2$) of the second region centered on the optical axis in a radial direction may be in a range of 20% to 50% of a sum ($r_1+r_2$) of a radius ($r_1$) of the first region and the width ($r_2$). According to the findings of the inventors of the present invention, when the width of the second region is in such a range, the influence on the light intensity distribution of the output light due to the deformation from the Gaussian distribution of the input light is more preferably alleviated.

Also, in each light irradiation device described above, the CGH may be a hologram for generating a uniform light intensity distribution in a predetermined region of the light converging surface of the light converged by the optical system. In this case, even when the uniformity of the light intensity distribution has been lost due to the deformation from the Gaussian distribution of input light, it is possible to restore uniformity of the light intensity distribution according to a function of the amplitude mask according to the above-described light irradiation device.

Advantageous Effects of Invention

A light irradiation device according to an aspect of the present invention can approximate an intensity distribution of output light to a desired distribution even when the light intensity distribution is deformed from a Gaussian distribution.

DESCRIPTION OF EMBODIMENTS

Hereinafter, an embodiment of a light irradiation device according to an aspect of the present invention will be described in detail with reference to the accompanying drawings. The same elements are denoted by the same reference signs in the description, and redundant description thereof will be omitted.

Figure 1:
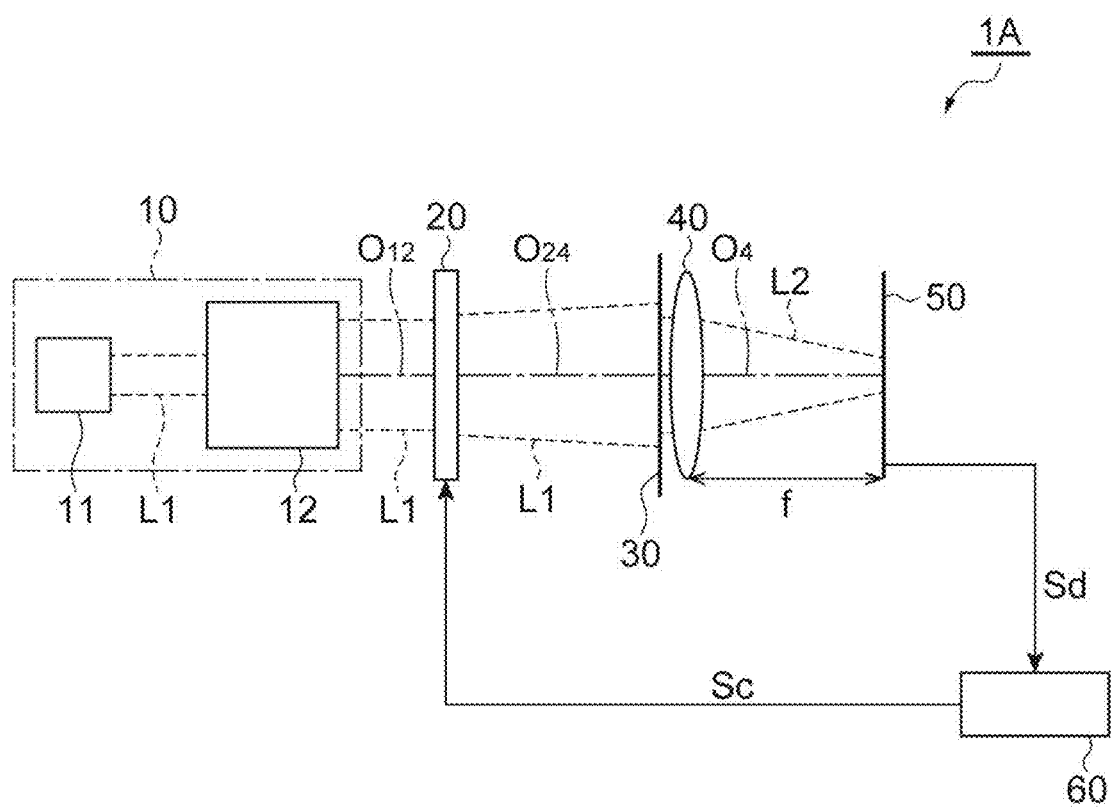
FIG. 1 is a diagram illustrating a configuration of a light irradiation device according to an embodiment of the present invention.

FIG. 1 is a diagram illustrating a configuration of a light irradiation device 1A according to the embodiment of the present invention. The light irradiation device 1A according to the present embodiment includes a Gaussian beam output unit 10, a spatial light modulator 20, an amplitude mask 30, a light converging optical system 40, a photodetector 50, and a control unit 60.

The Gaussian beam output unit 10 outputs light L1 having a light intensity distribution according to a Gaussian distribution. The Gaussian beam output unit 10 is configured to include, for example, a light source 11 and a beam expander 12 optically coupled to the light source 11. The light source 11 is configured to include, for example, a laser light source for pulse light oscillation or continuous wave oscillation, an SLD light source, an LED light source, or the like, and outputs light L1 having a light intensity distribution according to the Gaussian distribution. The beam expander 12 is configured to include, for example, a plurality of lenses arranged side by side on an optical path of the light L1, and adjusts a light diameter of the light L1 in a cross section perpendicular to optical axes of the plurality of lenses. In an example, the beam expander 12 expands the light diameter of the light L1.

The spatial light modulator 20 is optically coupled to the beam expander 12 and receives the light L1 from the beam expander 12. The spatial light modulator 20 presents a CGH, which is a modulating pattern for spatially modulating the light L1. The CGH to be presented on the spatial light modulator 20 is controlled by the control unit 60. The spatial light modulator 20 may be of a phase modulation type or an amplitude (intensity) modulation type. Also, the spatial light modulator 20 may be of either a reflection type or a transmission type. Also, a plurality of spatial light modulators 20 may be provided. In this case, the light L1 is modulated a plurality of times.

The amplitude mask 30 is optically coupled to the spatial light modulator 20, and is arranged on an optical axis $O_{24}$ between the spatial light modulator 20 and the light converging optical system 40 in the present embodiment. In other words, the amplitude mask 30 of the present embodiment is arranged on an optical path of the light L1 between the spatial light modulator 20 and the light converging optical system 40. Also, the amplitude mask 30 is an optical component having a predetermined transmittance distribution in a cross section perpendicular to the optical axis $O_{24}$. In an example, the amplitude mask 30 may include an absorptive or reflective ND filter. The transmittance distribution of the amplitude mask 30 will be described in detail below.

In the present embodiment, the light converging optical system 40 is optically coupled to the amplitude mask 30 and is arranged on the optical path of the light L1 and arranged to face an irradiation object. The light converging optical system 40 forms a light converging surface at a position separated by a focal length f from the light converging optical system 40, converts the light L1 output from the spatial light modulator 20 into output light L2 and converges the light on the light converging surface. The light converging optical system 40 includes, for example, one or more lenses (for example, an objective lens). The CGH to be presented on the spatial light modulator 20 designates an intensity distribution of the output light L2 converged by the light converging optical system 40 as a desired distribution on the light converging surface. Accordingly, the light intensity distribution of the light L1 maintains the Gaussian distribution between the spatial light modulator 20 and the light converging optical system 40.

The photodetector 50 is arranged on the light converging surface spaced by the focal length f from the light converging optical system 40 on an optical axis $O_4$ of the light converging optical system 40, and the light intensity distribution of the output light L2 converged by the light converging optical system 40 is detected. The photodetector 50 may include a multi-anode type photomultiplier tube (PMT) having a plurality of anodes or a plurality of point sensors such as photodiodes or avalanche photodiodes arranged in an array. Alternatively, the photodetector 50 may be an area image sensor having a plurality of pixels, such as a CCD image sensor, an EM-CCD image sensor, or a CMOS image sensor. The photodetector 50 provides the control unit 60 with output data Sd indicating the light intensity distribution of the output light L2. When the irradiation object is irradiated with the output light L2, the photodetector 50 is removed and the irradiation target is arranged at a position thereof.

The control unit 60 provides a CGH for generating a desired light intensity distribution in the output light L2 on the light converging surface of the light converging optical system 40 on the basis of the output data Sd from the photodetector 50. In other words, if the light intensity distribution of the output light L2 indicated by the output data Sd is away from the desired distribution, the control unit 60 calculates the CGH such that the light intensity distribution is approximated to the desired distribution. Alternatively, the control unit 60 stores a plurality of CGHs in advance, and selects a CGH for getting closer a desired distribution from among the plurality of CGHs according to the light intensity distribution of the output light L2 indicated by the output data Sd. The control unit 60 provides a control signal Sc including the calculated or selected CGH to the spatial light modulator 20.

Figure 2:
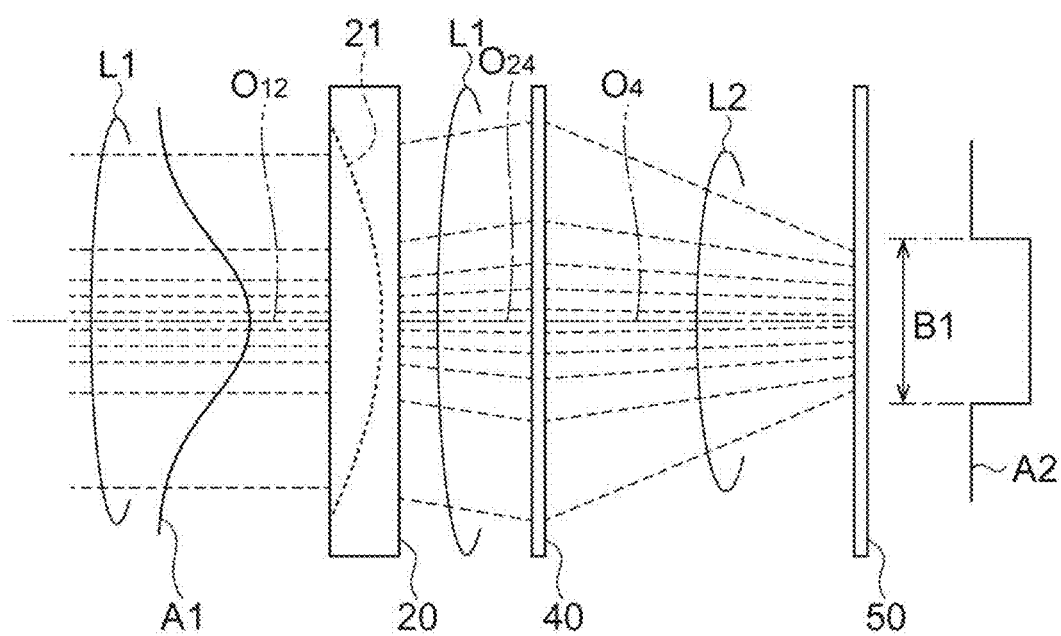
FIG. 2 is a diagram conceptually illustrating a modulation operation by a spatial light modulator.

FIG. 2 is a diagram conceptually illustrating a modulation operation by the spatial light modulator 20. In FIG. 2, a light density in a surface perpendicular to the optical axis $O_{24}$ and the optical axis $O_4$ is indicated by a density of broken lines (light rays), and the broken lines are more densely arranged when the light density is higher. As illustrated in FIG. 2, light L1 having a light intensity distribution A1 according to the Gaussian distribution is input to the spatial light modulator 20. The optical density of the light L1 is largest on the optical axis $O_{24}$ and decreases as the light L1 approaches the peripheral edge. A CGH 21 is presented on the spatial light modulator 20. The CGH 21 is a CGH for generating output light L2 having a desired light intensity distribution A2 on the light converging surface from the light L1. For example, as illustrated in FIG. 2, the light intensity distribution A2 of the output light L2 has a uniform distribution within a predetermined region B1 of the light converging surface. The predetermined region B1 is, for example, a region including the optical axis $O_4$ of the light converging optical system 40, and is a circular-shaped region centered on the optical axis $O_4$ in an example. In this case, the optical density of the output light L2 is constant in the predetermined region B1 and sharply drops outside the predetermined region B1.

In the above-described modulation operation, normally, as the CGH 21, a hologram is provided on an assumption that the light intensity distribution A1 is an ideal Gaussian distribution. However, a real intensity distribution of the light L1 may be discontinuously deformed from an ideal Gaussian distribution due to loss in a peripheral edge or the like by an optical component (for example, an aperture, an edge mask, or the like) arranged on the optical path. In such a case, if the CGH 21 for which an ideal Gaussian distribution is assumed is presented on the spatial light modulator 20, the obtained light intensity distribution A2 is away from a desired distribution. For example, if the peripheral edge of the light L1 is cut off by the aperture, the uniformity of the light intensity within the predetermined region B1 is deteriorated.

Therefore, in the present embodiment, as shown in the following Equations (2), a control parameter A for controlling a curvature $d\phi/d\xi$ of a phase $\phi(\xi)$ is introduced into the above Equations (1). By setting the control parameter A to an appropriate value, it is possible to approximate the uniformity of the light intensity within the predetermined region B1 to the original uniformity. This calculation is performed by the control unit 60.

[Math. 2]

$$\frac{d\varphi(\xi)}{d\xi} = B \cdot A \int_0^\xi I(\xi')d\xi' \quad (2)$$

$$I(\xi') = e^{-\xi'^2}$$

Figure 3:
FIG. 3 is a diagram illustrating an example of a relationship between a phase $\phi(\xi)$ and a light intensity distribution after shaping.

In order to set the control parameter A to an appropriate value, it is preferable to use a light intensity distribution indicated by the data Sd obtained by the photodetector 50. Here, FIG. 3 is a diagram illustrating an example of a relationship between a phase $\phi(\xi)$ and a light intensity distribution A2 after shaping. Also, in FIG. 3, a long broken line D1 of a phase $\varphi(\xi)$ field indicates an appropriate phase curve and a short broken line D2 indicates a phase curve before control.

As illustrated in the upper part of FIG. 3, if the control parameter A is an appropriate value (a curvature of the phase curve coincides with that of an appropriate phase curve), the light intensity within the predetermined region B1 is uniform. On the other hand, as illustrated in the middle part of FIG. 3, if the control parameter A is larger than an appropriate value, the light intensity within the predetermined region B1 is in a concave shape. In such a case, the control parameter A is set to be smaller, so that the light intensity within the predetermined region B1 can be approximated to being uniform. Also, as illustrated in the lower part of FIG. 3, if the control parameter A is smaller than an appropriate value, the light intensity in the predetermined region B1 is in a convex shape. In such a case, the control parameter A is set to be larger, so that the light intensity within the predetermined region B1 can be approximated to being uniform. An approximate value of A may be predetermined on the basis of a shape of the light intensity distribution indicated by the data Sd.

Figure 4:
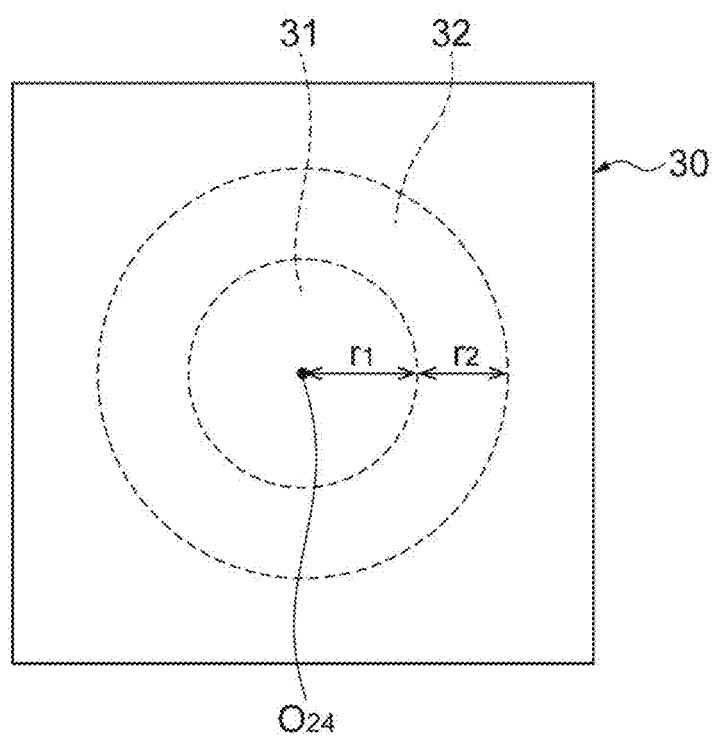
FIG. 4 is a plan view illustrating a configuration of an amplitude mask viewed from an optical axis direction.

As illustrated in FIG. 1, the amplitude mask 30 is arranged on the optical axis $O_{24}$ between the spatial light modulator 20 and the light converging optical system 40 in the present embodiment. The deformation of the light intensity distribution A2 due to the deformation from the ideal Gaussian distribution of the light intensity distribution A1 as described above can also be overcome by the amplitude mask 30. Here, FIG. 4 is a plan view illustrating a configuration of the amplitude mask 30 viewed from a direction of the optical axis $O_{24}$. As illustrated in FIG. 4, the amplitude mask 30 of the present embodiment has a first region 31 and a second region 32.

The first region 31 is a circular-shaped region centered on the optical axis $O_{24}$. The transmittance in the first region 31 is uniform, and is, for example, 100% or a value very close thereto. Accordingly, the light intensity distribution in the vicinity of the optical axis $O_{24}$ from the spatial light modulator 20 to the light converging optical system 40 is maintained as it is. Also, the second region 32 is an annular-shaped region (that is, symmetrical about the optical axis $O_{24}$) centered on the optical axis $O_{24}$ and surrounds the first region 31. The transmittance in the second region 32 continuously decreases (i.e., monotonically decreases) from the transmittance of the first region 31 as the distance from the optical axis $O_{24}$ increases. Accordingly, a light intensity of a part passing through the second region 32 in the light L1 continuously decreases (that is, monotonously decreases) from the light intensity of the peripheral edge of the first region 31 as the distance from the optical axis $O_{24}$ increases. As a result, an apodization effect (an effect of adding a favorable blurring effect to the image formation plane by enhancing a low frequency component and suppressing a high frequency component) can also be obtained on a hologram reproduction image plane different from the image formation plane. As shown in an example to be described below, a width $r_2$ of the second region 32 centered on the optical axis $O_{24}$ in a radial direction may be in a range of 20% to 50% of a sum $(r_1+r_2)$ of a radius $r_1$ of the first region and the width $r_2$.

Figure 5:
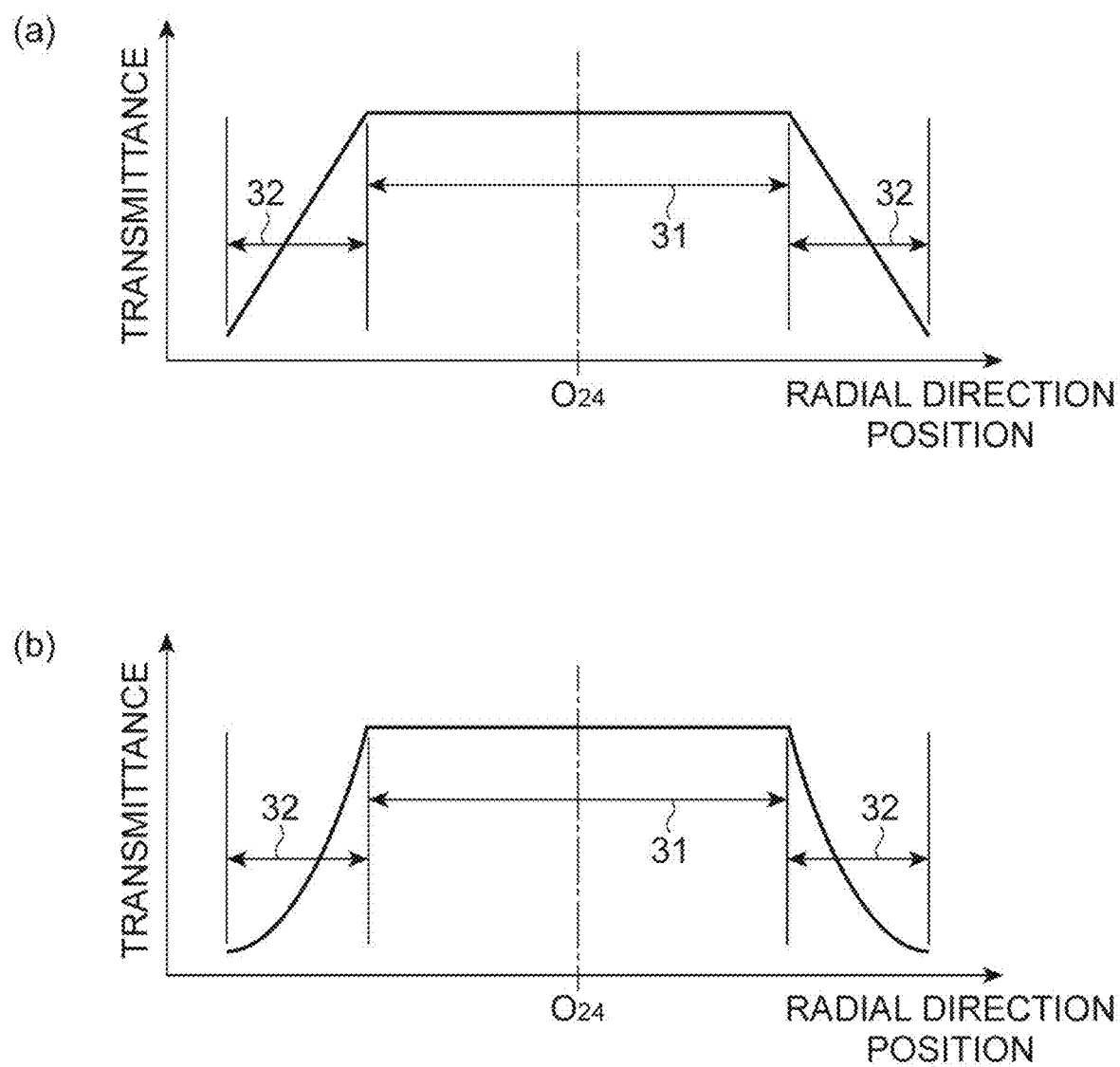
FIGS. 5(a) and 5(b) are a graph illustrating an example of a transmittance distribution of the amplitude mask in a cross section including an optical axis.
Figure 6:
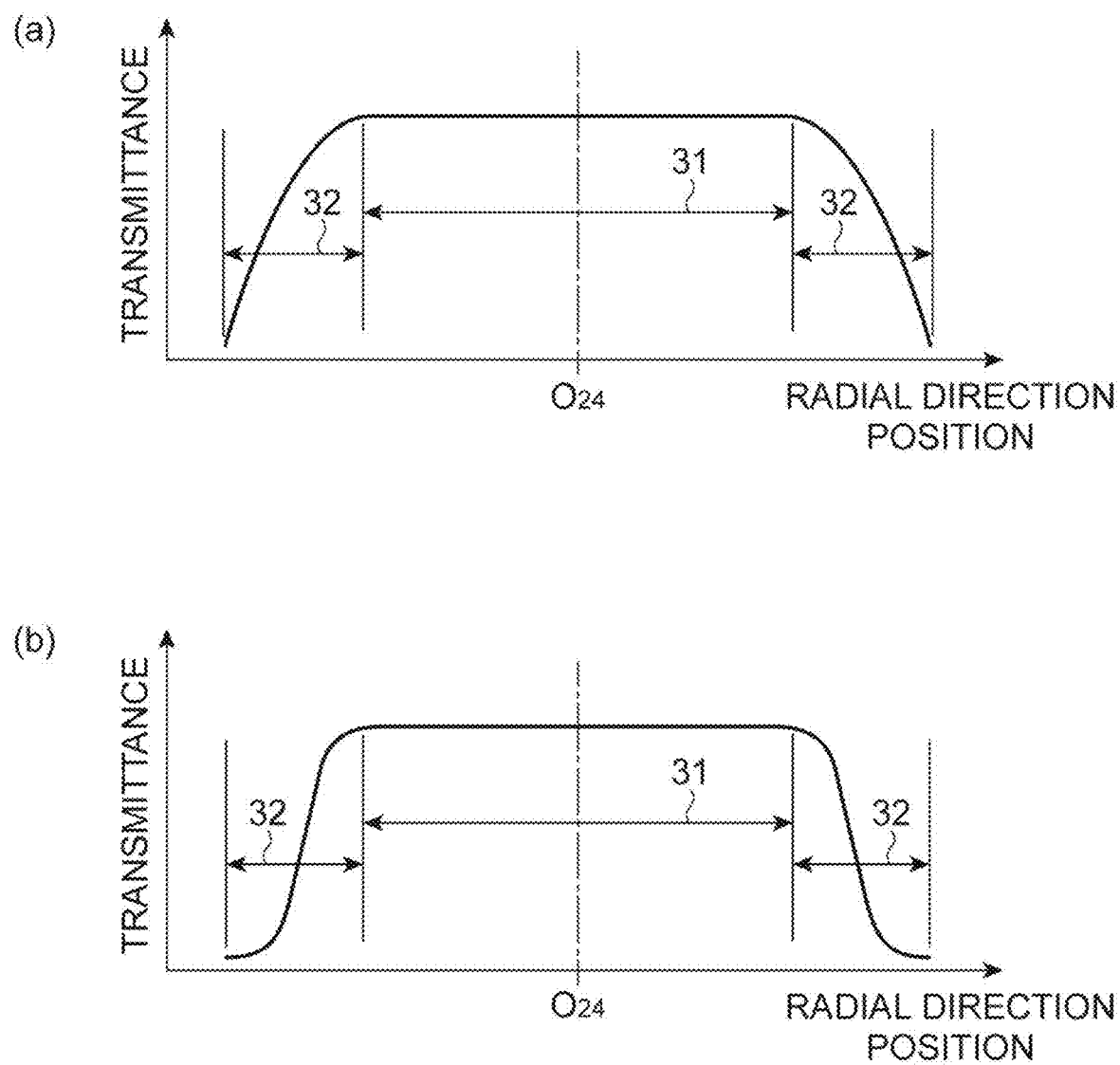
FIGS. 6(a) and 6(b) are a graph illustrating an example of a transmittance distribution of the amplitude mask in a cross section including an optical axis.

FIGS. 5 and 6 are graphs illustrating examples of a transmittance distribution of the amplitude mask 30 in a cross section including the optical axis $O_{24}$. In the example illustrated in FIG. 5(a), the transmittance in the second region 32 decreases in proportion to a distance from a boundary between the first region 31 and the second region 32. Also, in the examples illustrated in FIGS. 5(b) and 6(a), the transmittance in the second region 32 is a quadratic function in which the distance from the boundary between the first region 31 and the second region 32 is set as a variable. FIG. 5(b) illustrates a case in which a quadratic curve is convex downward (i.e., a second derivative is always positive), and FIG. 6(a) illustrates a case in which the quadratic curve is convex upward (i.e., a second derivative is always negative). In the example illustrated in FIG. 6(b), the transmittance in the second region 32 is a SIGMOID function in which the distance from the boundary between the first region 31 and the second region 32 is set as a variable.

Figure 7:
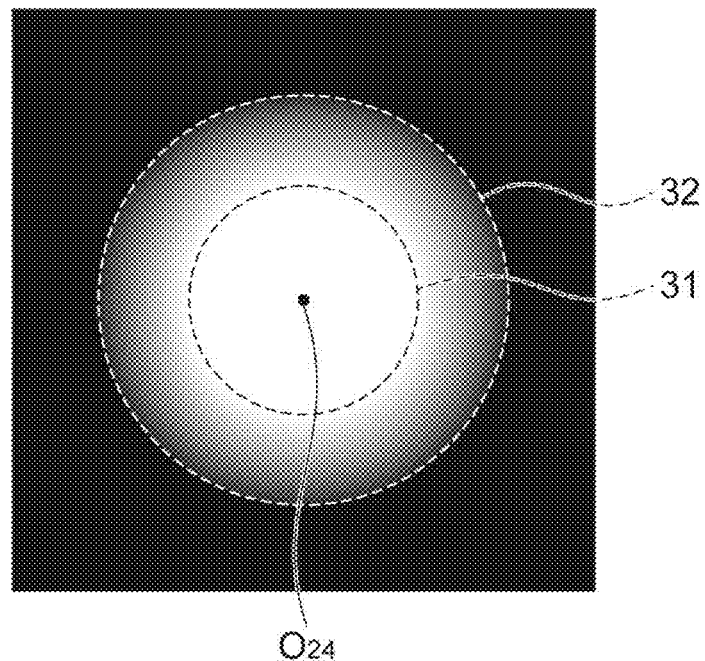
FIG. 7 is a diagram illustrating an example of an intensity distribution of light transmitted through the amplitude mask.

FIG. 7 is a diagram illustrating an example of a light intensity distribution of light L1 transmitted through the amplitude mask 30 having the above-described transmittance distribution, wherein the light intensity is represented by shading of a color. The light intensity is weaker when a region is blacker and the light intensity is stronger when a region is whiter. As illustrated in FIG. 7, in the light intensity distribution of the light L1 after passing through the amplitude mask 30, a light intensity of a part transmitted through the second region 32 decreases continuously as the distance from the optical axis $O_{24}$ increases.

Figure 8:
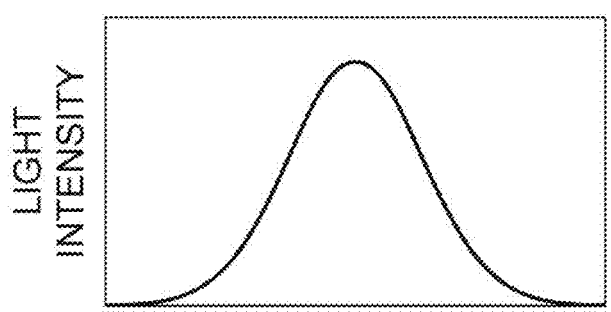
FIGS. 8(a) and 8(b) are a simulation result illustrating an effect.
Figure 8:
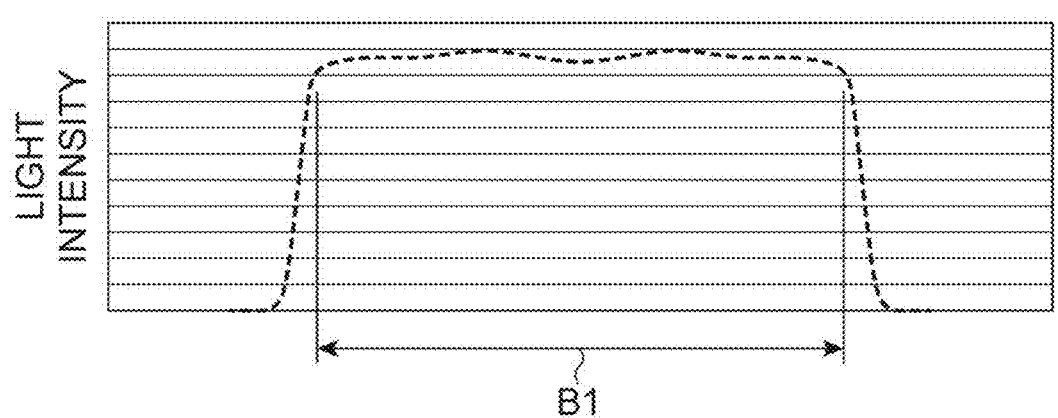
Figure 9:
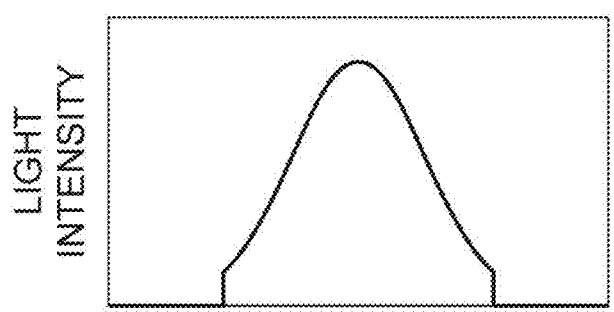
FIGS. 9(a) and 9(b) are a simulation result illustrating an effect.
Figure 9:
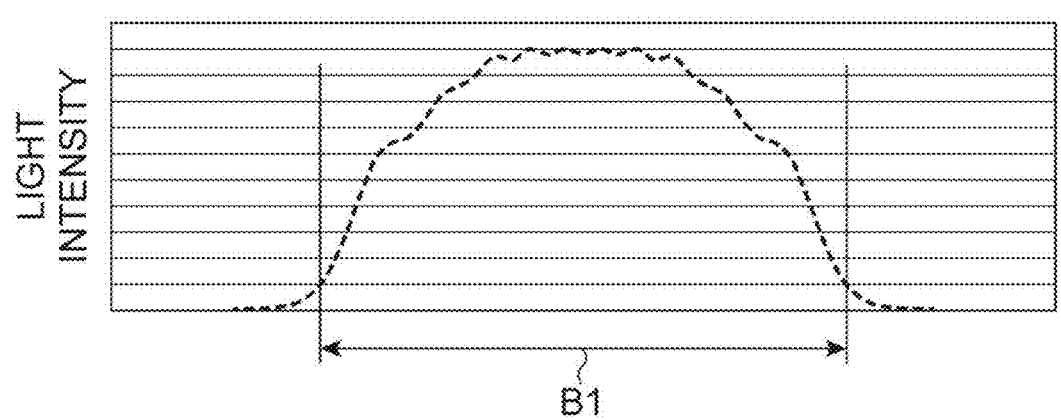
Figure 10:
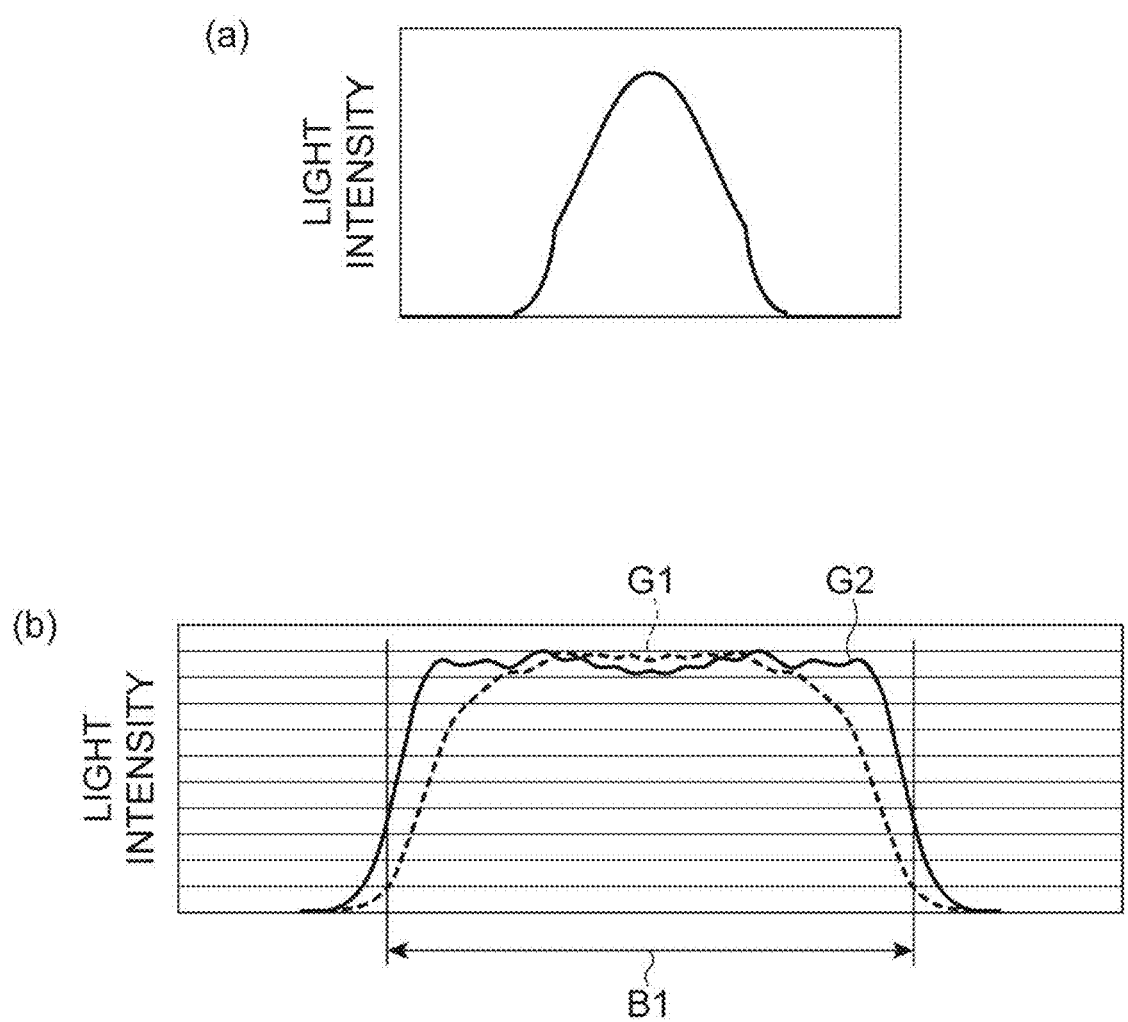
FIGS. 10(a) and 10(b) are a simulation result illustrating an effect.

Here, FIGS. 8 to 10 are simulation results illustrating effects according to the present embodiment. In FIGS. 8 to 10, the vertical axis represents a light intensity and the horizontal axis represents a radial direction position on a cross section including the optical axis $O_{24}$. If the light L1 has an ideal Gaussian distribution as illustrated in FIG. 8(a), the light intensity distribution of the output light L2 on the light converging surface has a substantially uniform top hat shape in a predetermined region B1 as illustrated in FIG. 8(b). However, if the tail of the light intensity distribution of the light L1 is interrupted discontinuously by the aperture as illustrated in FIG. 9(a), the light intensity distribution of the output light L2 on the light converging surface has a shape in which the uniformity is impaired in the predetermined region B1 as illustrated in FIG. 9(b). In these examples, the control parameter was set to 19000.

On the other hand, if the light intensity of the part of the light L1 passing through the second region 32 continuously decreases as the distance from the optical axis $O_{24}$ increases as illustrated in FIG. 10(a), the light intensity in the predetermined region B1 is approximated to being uniform as compared with FIG. 9(b) as indicated by a graph G1 of FIG. 10(b) (the apodization effect of the amplitude mask 30). Also, if the control parameter has been set to a more preferable 28000, the light intensity in the predetermined region B1 is approximated to being more uniform than in the graph G1 as indicated by a graph G2 in FIG. 10(b) (an effect of restoring a contrast of a degraded high frequency component).

In this manner, the inventors of the present invention have found that the influence of the deformation on the light intensity distribution of the output light L2 on the light converging surface is alleviated even when the intensity distribution of light L1 is discontinuously deformed from the Gaussian distribution if the light intensity of the light L1 transmitted through the second region 32 continuously decreases as the distance from the optical axis $O_{24}$ increases in the amplitude mask 30. Also, for example, as illustrated in FIGS. 5 and 6, the light intensity of the light L1 transmitted through the second region 32 can be realized by continuously decreasing the transmittance of the second region 32 as the distance from the optical axis O24 increases. Therefore, according to the present embodiment, even when the intensity distribution of the light L1 is discontinuously deformed from the Gaussian distribution, the intensity distribution of the output light L2 can be approximated to a desired distribution.

A discontinuous part in the intensity distribution of the light L1 can pass through outside of the second region 32. In other words, an outer edge of the second region 32 may be defined by a discontinuous part in the intensity distribution of the light L1. Also, it is only necessary for the light L1 to have a Gaussian distribution, and a beam diameter of the light L1 is not limited.

As in the present embodiment, the light irradiation device 1A may further include the photodetector 50 that detects a light intensity distribution on the light converging surface of the output light L2 converged by the light converging optical system 40, and the control unit 60 that provides a CGH for generating a desired light intensity distribution on the light converging surface on the basis of output data from the photodetector 50. According to this configuration, it is possible to restore a contrast of a high frequency decreased by the apodization effect of the amplitude mask in the CGH control. In particular, according to the configuration that controls both the amplitude distribution and the phase distribution, the light intensity distribution on the light converging surface can be approximated to the desired distribution through the feedback control more accurately. Also, because the second region 32 of the amplitude mask 30 has the above-described configuration, it is easier to approximate the light intensity distribution on the light converging surface to a desired distribution.

Also, as in this embodiment, the transmittance in the first region 31 may be uniform. Thereby, it is easier to approximate the light intensity distribution on the light converging surface to the desired distribution. Also, for example, if the transmittance in the first region 31 is substantially 100%, light loss by the amplitude mask 30 can be reduced and light utilization efficiency can be enhanced.

Also, as in the present embodiment, a width $r_2$ of the second region 32 centered on the optical axis $O_{24}$ in a radial direction is in a range of 20% to 50% of a sum $(r_1+r_2)$ of a radius $r_1$ of the first region 31 and the width $r_2$. According to the findings of the inventor of the present invention as will be described below, when the width of the second region 32 is in such a range, the influence of the output light on the light intensity distribution of the light L2 due to the deformation from the Gaussian distribution of the light L1 is more preferably alleviated.

As in the present embodiment, the CGH presented on the spatial light modulator 20 may be a hologram for generating a uniform light intensity distribution within the predetermined region B1 of the light converging surface. In such a case, even when the uniformity of the light intensity distribution is impaired by the deformation from the Gaussian distribution of the light L1, the uniformity of the light intensity distribution can be restored by the function of the amplitude mask 30.

MODIFIED EXAMPLE

Figure 11:
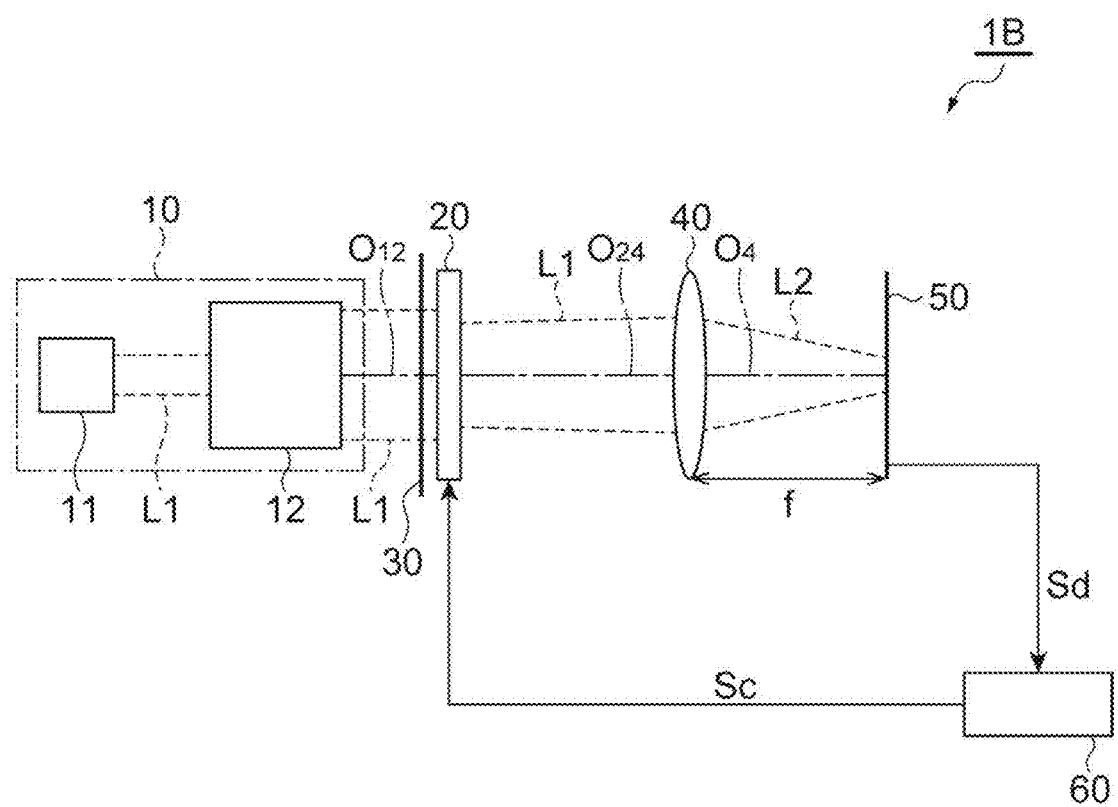
FIG. 11 is a diagram illustrating a configuration of a light irradiation device according to a first modified example.

FIG. 11 is a diagram illustrating a configuration of a light irradiation device 1B according to the modified example of the above-described embodiment. A difference between this modified example and the above-described embodiment is an arrangement of an amplitude mask 30. In the present modified example, the amplitude mask 30 is arranged on an optical axis $O_{12}$ between a Gaussian beam output unit 10 and a spatial light modulator 20. In other words, the amplitude mask 30 is arranged on an optical path of light L1 between the Gaussian beam output unit 10 and the spatial light modulator 20. Also in such a configuration, effects similar to those of the above-described embodiment can be obtained. The amplitude mask 30 may be arranged on both optical axes $O_{12}$ and $O_{24}$ between the Gaussian beam output unit 10 and the spatial light modulator 20 and between the spatial light modulator 20 and a light converging optical system 40. The operation and effects of the present modified example are understood by replacing the optical axis $O_{24}$ in FIGS. 4, 5, and 6 in the above embodiment with the optical axis $O_{12}$.

First Example

Figure 12:
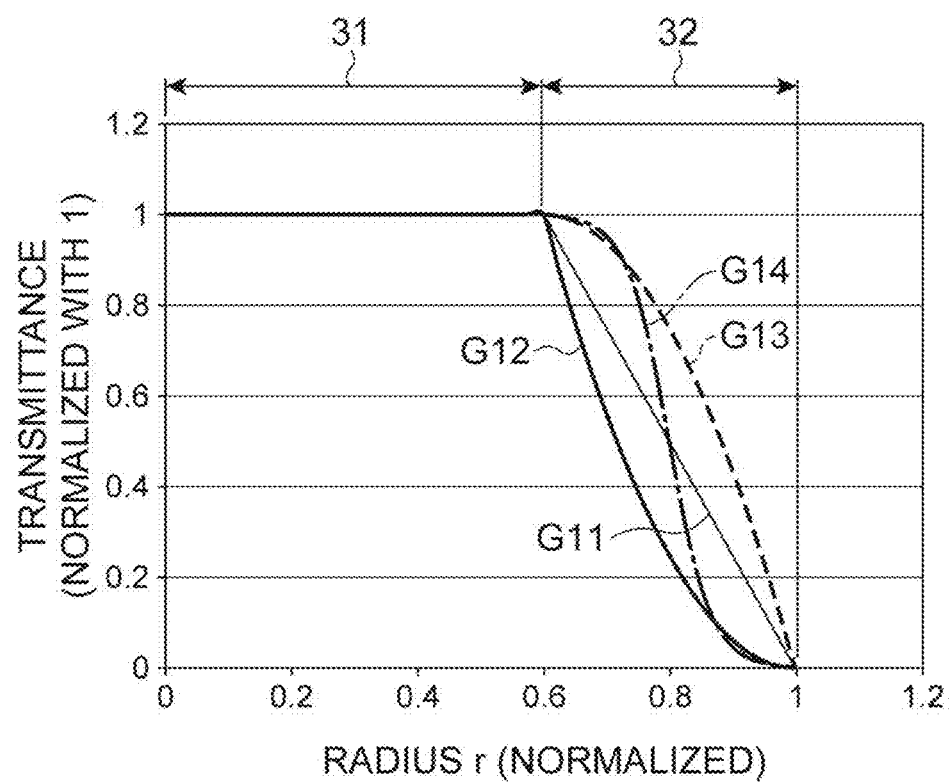
FIG. 12 is a graph illustrating a transmittance distribution of the amplitude mask.

Here, the first example of the above-described embodiment will be described. FIG. 12 is a graph illustrating a transmittance distribution of the amplitude mask 30 in the present example, wherein the vertical axis represents normalized transmittance and the horizontal axis represents a normalized radial direction position. Graphs G11 to G14 illustrated in FIG. 12 correspond to FIGS. 5(a), 5(b), 6(a), and 6(b), respectively. A width $r_2$ of a second region 32 was set to 40% of a sum $(r_1+r_2)$ of a radius $r_1$ of a first region 31 and the width $r_2$.

Figure 13:
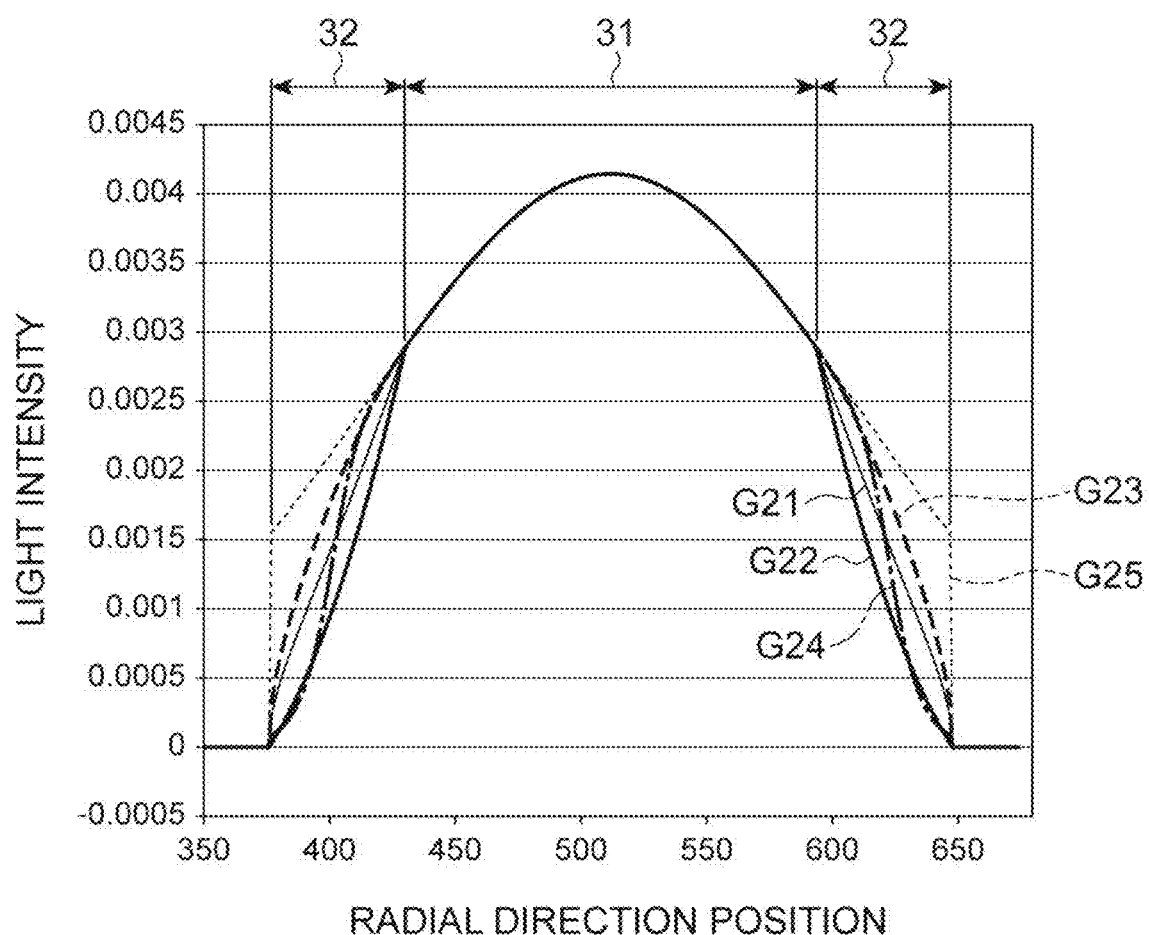
FIG. 13 is a graph illustrating an intensity distribution of light transmitted through the amplitude mask.

FIG. 13 is a graph illustrating a light intensity distribution of light L1 transmitted through the amplitude mask 30, wherein the vertical axis represents a light intensity and the horizontal axis represents a radial direction position in a cross section perpendicular to the optical axis. Graphs G21 to G24 correspond to the graphs G11 to G14 of FIG. 12, respectively. A graph G25 shows a light intensity distribution of the light L1 when no amplitude mask 30 is provided for comparison. As illustrated in FIG. 13, in the present example, the light intensity of the light L1 transmitted through the second region 32 continuously decreases as the distance from the optical axis increases.

Figure 14:
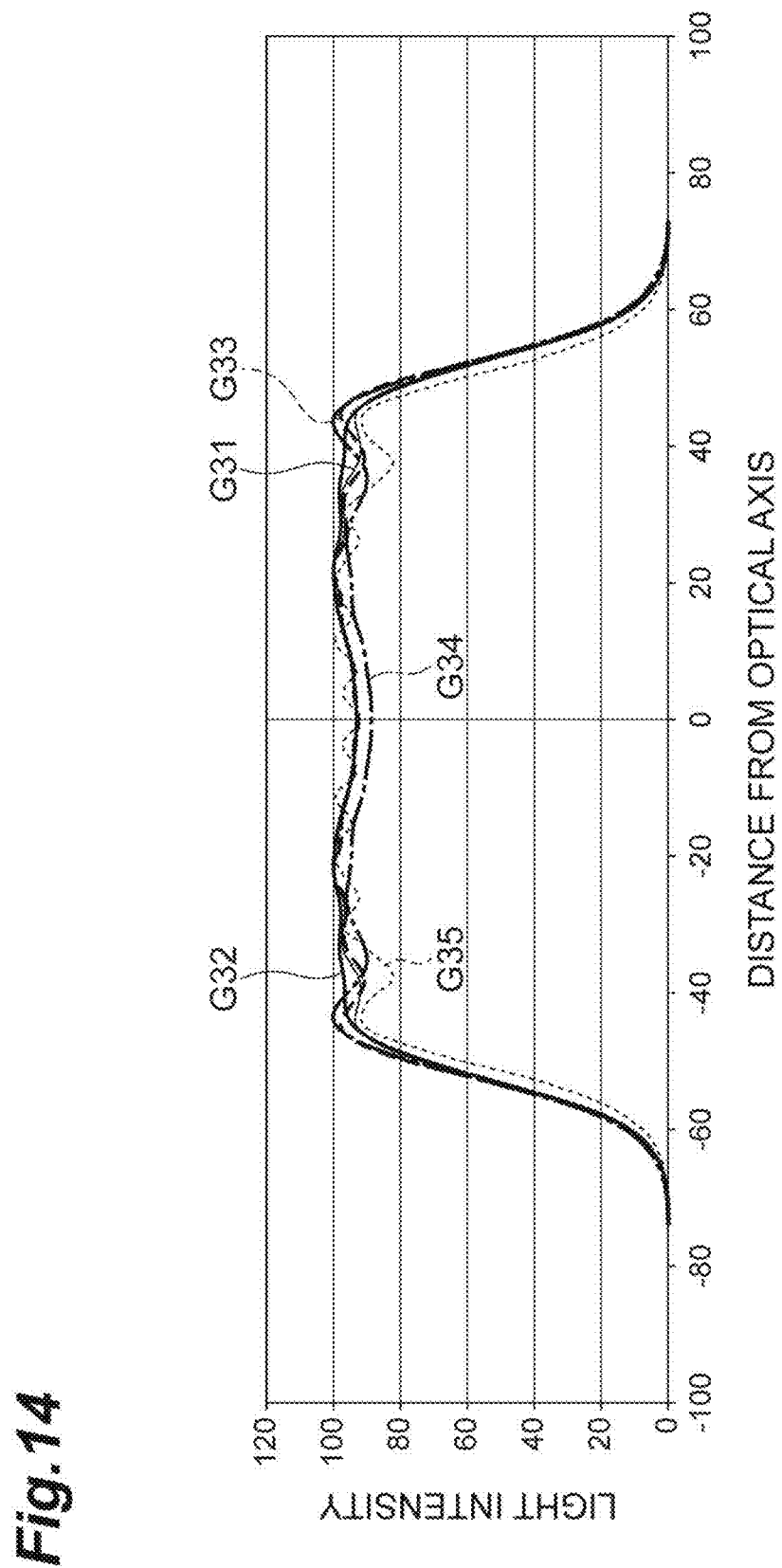
FIG. 14 is a graph illustrating an intensity distribution of output light on a light converging surface when light having a light intensity distribution illustrated in FIG. 13 has been input to a light converging optical system.

FIG. 14 is a graph illustrating a light intensity distribution of output light L2 on a light converging surface when the light L1 having the light intensity distribution illustrated in FIG. 13 has been input to the light converging optical system 40. The vertical axis represents a light intensity and the horizontal axis represents a distance from the optical axis. Graphs G31 to G35 correspond to the graphs G21 to G25 of FIG. 13, respectively. As illustrated in FIG. 14, if no amplitude mask 30 is provided (graph G35), the uniformity of a light intensity in a predetermined region is significantly impaired. On the other hand, if the amplitude mask 30 is provided (graphs G31 to G34), the uniformity of the light intensity in the predetermined region is improved. In particular, if the transmittance in the second region 32 is a downwardly convex quadratic function in which the distance from the boundary between the first region 31 and the second region 32 is set as a variable (graph G32), improvement of uniformity is significant.

As shown in the present example, according to the light irradiation device 1A of the above embodiment, even when the intensity distribution of the light L1 is discontinuously deformed from the Gaussian distribution, the intensity distribution of the output light L2 can be approximated to a desired distribution.

Second Example

Figure 15:
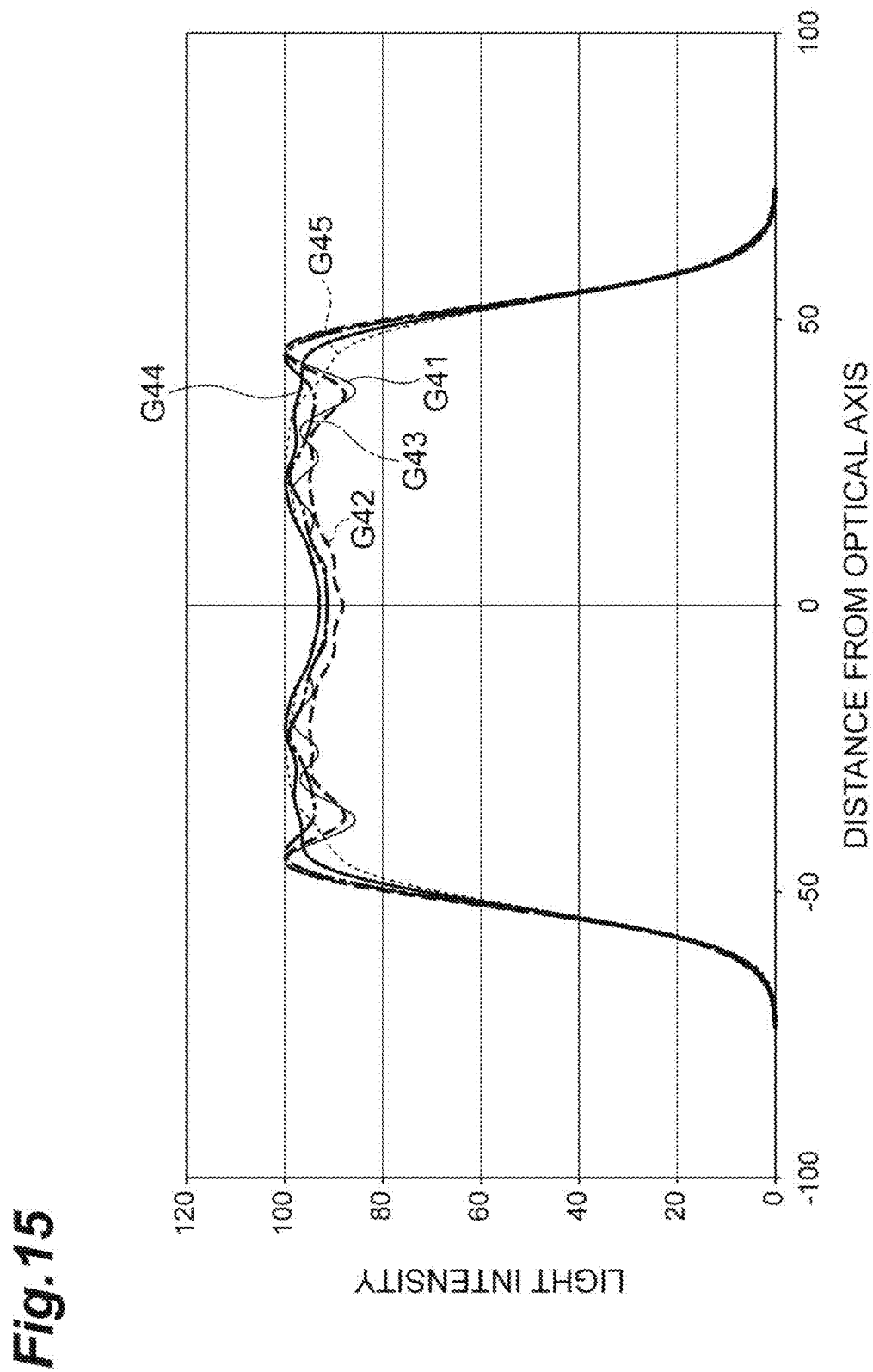
FIG. 15 is a graph illustrating an intensity distribution of output light on a light converging surface when a width of a second region of the amplitude mask has been varied.

The second example of the above-described embodiment will be described. FIG. 15 is a graph illustrating a light intensity distribution of output light L2 on a light converging surface when the width $r_2$ of the second region 32 of the amplitude mask 30 has been varied. The vertical axis represents a light intensity and the horizontal axis represents a distance from the optical axis. Graphs G41 to G45 indicate cases in which the width $r_2$ of the second region 32 is 10%, 20%, 30%, 40%, and 50% of the sum $(r_1+r_2)$ of the radius $r_1$ of the first region 31 and the width $r_2$, respectively. In the present example, transmittance in the second region 32 is a downwardly convex quadratic function in which the distance from the boundary between the first region 31 and the second region 32 is set as a variable (see FIG. 5(b)).

Referring to FIG. 15, it can be seen that, if the width $r_2$ is in a range of 20% to 50% of the sum $(r_1+r_2)$, the uniformity of the light intensity in the predetermined region is further improved. In particular, when the width $r_2$ is in a range of 30% to 40% of the sum $(r_1+r_2)$, the uniformity of light intensity is further improved. Accordingly, in the above-described embodiment, it is preferable that the width $r_2$ be in a range of 20% to 50% of the sum $(r_1+r_2)$, and it is more preferable that the width $r_2$ be in a range of 30% to 40% of the sum $(r_1+r_2)$.

Third Example

Figure 16:
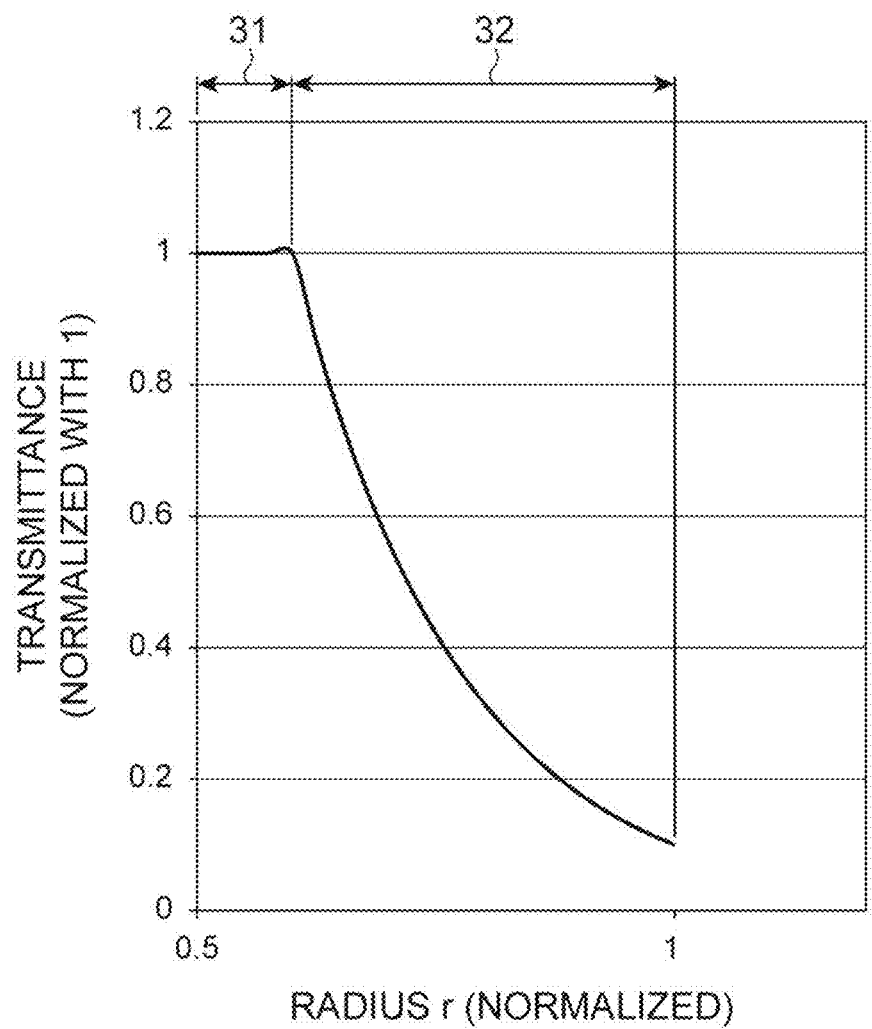
FIG. 16 is a graph illustrating a transmittance distribution of an amplitude mask in a third example.

The third example of the above-described embodiment will be described. FIG. 16 is a graph illustrating a transmittance distribution of an amplitude mask 30 in the present example, wherein the vertical axis represents normalized transmittance and the horizontal axis represents a normalized radial direction position. As illustrated in FIG. 16, in the present embodiment, the boundary between the first region 31 and the second region 32 of the amplitude mask 30 is set at a position at which a light intensity at the boundary is 90% of the light intensity at the optical axis (the optical axis $O_{12}$ and/or the optical axis $O_{24}$). The transmittance in the second region 32 is a downwardly convex quadratic function in which the distance from the boundary between the first region 31 and the second region 32 is set as a variable (see FIG. 5(b)). Further, the transmittance at the outer periphery of the second region 32 was set to a value larger than zero.

Figure 17:
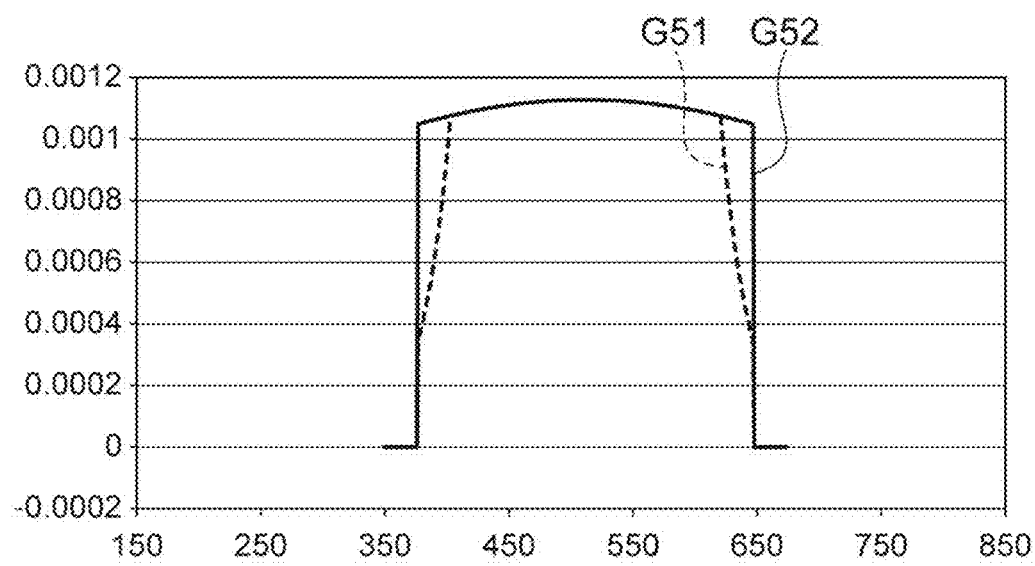
FIG. 17(a) is a graph illustrating an intensity distribution of light transmitted through an amplitude mask.
FIG. 17(b) is a graph illustrating an intensity distribution output light on a light converging surface.
Figure 17:
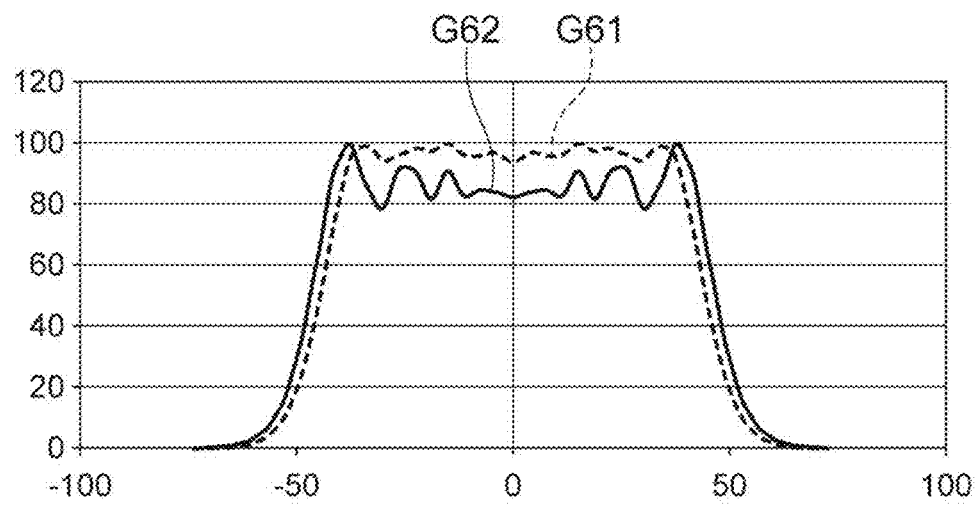

FIG. 17(a) is a graph illustrating an intensity distribution of light L1 transmitted through the amplitude mask 30, wherein the vertical axis represents a light intensity and the horizontal axis represents a radial direction position in a cross section perpendicular to the optical axis. A graph G51 shows a case in which the amplitude mask 30 is provided and a graph G52 shows a case in which no amplitude mask 30 is provided.

FIG. 17(b) is a graph illustrating a light intensity distribution of output light L2 on a light converging surface. The vertical axis represents a light intensity and the horizontal axis represents a distance from the optical axis. A graph G61 corresponds to a graph G51 of FIG. 17(a) and a graph G62 corresponds to a graph G52 of FIG. 17(a). As illustrated in FIG. 17(b), according to the above embodiment, even when the light intensity distribution of the light L1 has a shape obtained by cutting only the vicinity of a center portion of the Gaussian distribution, an intensity distribution of the output light L2 in the predetermined region can be approximated to a desired distribution according to a function and effect of the amplitude mask 30.

The light irradiation device according to the present invention is not limited to the above-described embodiment, and other various modifications are possible. For example, although variations of various transmittance distributions are illustrated in FIGS. 5 and 6 in the above-described embodiment, the present invention is not limited to these transmittance distributions, and other distributions may be used as long as the transmittance of the second region continuously decreases as the distance from the optical axis increases. For example, a transmittance distribution in the first region may not be uniform. Also, even if the transmittance of the second region sometimes increases as the distance from the optical axis increases, it is only necessary for the intensity distribution of the light to continuously decrease after passing through the second region as the distance from the optical axis increases. Also, the control unit performs feedback control of a CGH on the basis of output data from the photodetector in the above-described embodiment, but the spatial light modulator may present a CGH calculated or selected in advance without performing such feedback control. Further, the optical system for converging light modulated by the spatial light modulator 20 is not limited to a light converging optical system, and a projection optical system such as a projection lens may be used. Thereby, the light irradiation device according to the present invention can be used as a projection device such as a projector.

INDUSTRIAL APPLICABILITY

It is possible to approximate an intensity distribution of output light to a desired distribution even when the light intensity distribution is deformed from a Gaussian distribution.

REFERENCE SIGNS LIST 1A, 1B Light irradiation device
10 Gaussian beam output unit
11 Light source
12 Beam expander
20 Spatial light modulator
30 Amplitude mask
31 First region
32 Second region
40 Light converging optical system
50 Photodetector
60 Control unit
A1, A2 Light intensity distribution
B1 Predetermined region
f Focal length
L1 Light
L2 Output light
$O_{12}$, $O_{24}$, $O_4$ Optical axis
Sc Control signal
Sd Output data

The invention claimed is:

1. A light irradiation device comprising:
   a Gaussian beam output unit configured to output light having a light intensity distribution that conforms to a Gaussian distribution;
   a spatial light modulator configured to receive the light and modulate the light by presenting a computer generated hologram;
   an optical system configured to converge the modulated light; and
   an amplitude mask optically coupled directly to the spatial light modulator and arranged on at least one of an optical axis between the Gaussian beam output unit and the spatial light modulator and an optical axis between the spatial light modulator and the optical system,
   wherein the amplitude mask has a circular-shaped first region centered on the optical axis and an annular-shaped second region that surrounds the first region, and
   wherein transmittance in the second region continuously decreases as a distance from the optical axis increases.

2. The light irradiation device according to claim 1, further comprising:
   a photodetector configured to detect a light intensity distribution on a light converging surface of the light converged by the optical system; and
   a control unit configured to provide the computer generated hologram for generating a desired light intensity distribution on the light converging surface on the basis of output data from the photodetector.

3. The light irradiation device according to claim 1, wherein transmittance in the first region is uniform.

4. The light irradiation device according to claim 1, wherein a width ($r_2$) of the second region centered on the optical axis in a radial direction is in a range of 20% to 50% of a sum ($r_1+r_2$) of a radius ($r_1$) of the first region and the width ($r_2$).

5. The light irradiation device according to claim 1, wherein the computer generated hologram is a hologram for generating a uniform light intensity distribution in a predetermined region of the light converging surface of the light converged by the optical system.

6. A light irradiation device comprising:
   a Gaussian beam output unit configured to output light having an intensity distribution that conforms to a Gaussian distribution;
   a spatial light modulator configured to receive the light and modulate the light by presenting a computer generated hologram;
   an optical system configured to converge the modulated light; and
   an amplitude mask optically coupled directly to the spatial light modulator and arranged on at least one of an optical axis between the Gaussian beam output unit and the spatial light modulator and an optical axis between the spatial light modulator and the optical system,
   wherein the amplitude mask has a circular-shaped first region centered on the optical axis and an annular-shaped second region that surrounds the first region, and
   wherein a light intensity of a part of the light transmitted through the second region continuously decreases as a distance from the optical axis increases.

7. The light irradiation device according to claim 6, further comprising:
   a photodetector for detecting a light intensity distribution on a light converging surface of the light converged by the optical system; and
   a control unit for providing the computer generated hologram for generating a desired light intensity distribution on the light converging surface on the basis of output data from the photodetector.

8. The light irradiation device according to claim 6, wherein transmittance in the first region is uniform.

9. The light irradiation device according to claim 6, wherein a width (r2) of the second region centered on the optical axis in a radial direction is in a range of 20% to 50% of a sum (r1+r2) of a radius (r1) of the first region and the width (r2).

10. The light irradiation device according to claim 6, wherein the computer generated hologram is a hologram for generating a uniform light intensity distribution in a predetermined region of the light converging surface of the light converged by the optical system.

* * * * *